(12) United States Patent
Nakagawa et al.

(10) Patent No.: US 11,634,164 B2
(45) Date of Patent: Apr. 25, 2023

(54) OPERATION SELECTION DEVICE DECIDING ON VEHICLE OPERATION USING WEIGHTING

(71) Applicant: TOYOTA JIDOSHA KABUSHIKI KAISHA, Toyota (JP)

(72) Inventors: Yasuki Nakagawa, Toyota (JP); Atsushi Hanawa, Miyoshi (JP); Makoto Matsushita, Ichinomiya (JP); Yusuke Yokota, Susono (JP); Tomoyuki Kuriyama, Hadano (JP); Tae Sugimura, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 356 days.

(21) Appl. No.: 16/891,296

(22) Filed: Jun. 3, 2020

(65) Prior Publication Data
US 2021/0031808 A1 Feb. 4, 2021

(30) Foreign Application Priority Data

Jul. 30, 2019 (JP) .............................. JP2019-140114

(51) Int. Cl.
*B60W 60/00* (2020.01)
*G08G 1/01* (2006.01)
(52) U.S. Cl.
CPC ....... *B60W 60/0059* (2020.02); *G08G 1/0129* (2013.01); *G08G 1/0145* (2013.01); *B60W 2556/45* (2020.02)
(58) Field of Classification Search
CPC .......... B60W 60/0059; B60W 2556/45; G08G 1/0129; G08G 1/0145
See application file for complete search history.

(56) References Cited

U.S. PATENT DOCUMENTS

2018/0356814 A1* 12/2018 Brooks ................. A61B 5/369
2020/0310431 A1* 10/2020 Matsunaga .......... G05D 1/0061

FOREIGN PATENT DOCUMENTS

JP 2018-077649 A 5/2018

OTHER PUBLICATIONS

English Translation of JP2018077649A Title: Remote Operation Control Device, Vehicle Control System, Remote Operation Control Method Date: May 17, 2018 Author: Boda et al. (Year: 2018).*

(Continued)

*Primary Examiner* — James J Lee
*Assistant Examiner* — Steven Vu Nguyen
(74) *Attorney, Agent, or Firm* — Oliff PLC

(57) ABSTRACT

An operation selection device includes a memory and a processor. The processor is configured to perform communication between a self-driving device provided at a vehicle which performs self-driving, and a plurality of operating devices that enable the vehicle to be driven remotely via a remote-control operation performed by a remote-control driver, and that are individually provided for each of a plurality of remote-control drivers, and to acquire information relating to remote-control operations performed by each remote-control driver using each of the plurality of operating devices for a receiving remote-control operation in the vehicle currently being driven remotely, using a predetermined weighting, one remote-control operation among many acquired remote-control operations, and to output information related to remote-control operation that has been decided on to the vehicle, and to allocate a score, which is reflected in the weighting, to the remote-control driver who performed the remote-control operation that has been decided.

15 Claims, 13 Drawing Sheets

(56) References Cited

OTHER PUBLICATIONS

English Translation of CN108932828A Title: Method and Terminal for Realizing Remote Control of Unmanned Vehicle Date: Apr. 12, 2018 Author: Zhang, Cheng (Year: 2018).*

* cited by examiner

FIG.8A

NAGOYA CITY 9:00~18:00

| OPERATOR | A | B | C | D | E | F | G | H |
|---|---|---|---|---|---|---|---|---|
| INDIVIDUAL SCORE | 100 | 200 | 150 | 90 | 180 | 250 | 120 | 180 |
| NUMBER OF VEHICLES ABLE TO BE PROCESSED | 8 | 10 | 7 | 6 | 9 | 10 | 7 | 8 |

FIG.8B

NAGOYA CITY 18:00~3:00

| OPERATOR | A | B | C | D | E | F | G | H |
|---|---|---|---|---|---|---|---|---|
| INDIVIDUAL SCORE | — | 180 | 150 | — | 150 | 210 | 200 | — |
| NUMBER OF VEHICLES ABLE TO BE PROCESSED | — | 10 | 6 | — | 5 | 7 | 7 | — |

FIG.8C

SENDAI CITY 9:00~18:00

| OPERATOR | A | B | C | D | E | F | G | H |
|---|---|---|---|---|---|---|---|---|
| INDIVIDUAL SCORE | 180 | 70 | 160 | 150 | 160 | 200 | 210 | 180 |
| NUMBER OF VEHICLES ABLE TO BE PROCESSED | 10 | 10 | 6 | 10 | 7 | 8 | 8 | 8 |

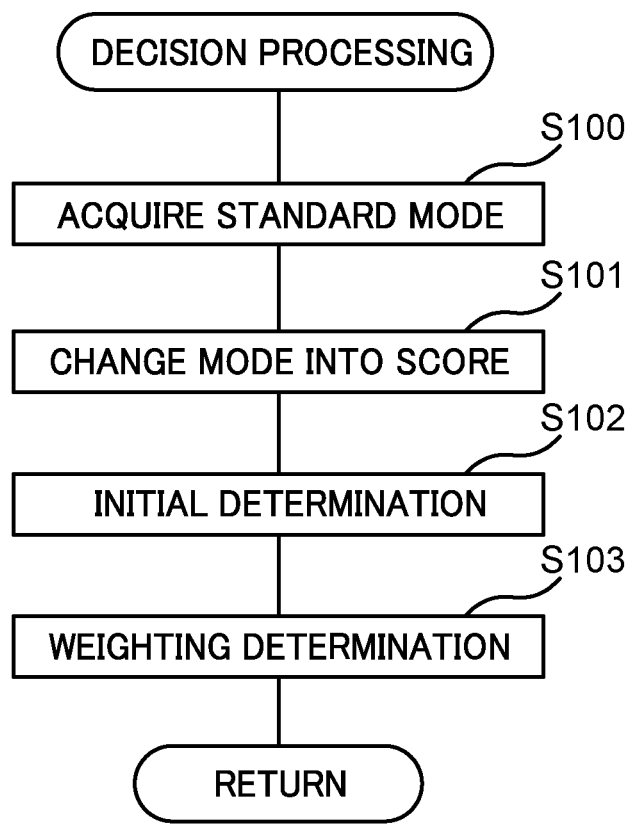

FIG.12A

| OPERATOR | A | B | C | D | E |
|---|---|---|---|---|---|
| MODE SCORE | 5 | 7 | 8 | 9 | -1 |

FIG.12B

| OPERATOR | A | B | C | D | E |
|---|---|---|---|---|---|
| MODE SCORE (x) | 5 | 7 | 8 | 9 | |
| INDIVIDUAL SCORE (y) | 210 | 200 | 150 | 90 | |
| DETERMINATION VALUE (x × y) | 1,050 | 1,400 | 1,200 | 810 | |

FIG.13A

LEFT TURN OPERATION

| OPERATOR | A | B | C | D | E | F | G | H |
|---|---|---|---|---|---|---|---|---|
| INDIVIDUAL SCORE | 250 | 210 | 120 | 150 | 100 | 90 | 170 | 180 |
| NUMBER OF VEHICLES ABLE TO BE PROCESSED | 10 | 9 | 7 | 6 | 8 | 6 | 9 | 7 |

FIG.13B

OVERTAKING MANEUVER

| OPERATOR | A | B | C | D | E | F | G | H |
|---|---|---|---|---|---|---|---|---|
| INDIVIDUAL SCORE | 200 | 180 | 150 | 100 | 150 | 100 | 200 | 170 |
| NUMBER OF VEHICLES ABLE TO BE PROCESSED | 10 | 9 | 8 | 5 | 8 | 7 | 10 | 6 | ns of vehicle remote-control driving operations to be
OPERATION SELECTION DEVICE DECIDING ON VEHICLE OPERATION USING WEIGHTING

CROSS-REFERENCE TO RELATED APPLICATION

This application is based on and claims priority under 35 USC 119 from Japanese Patent Application No. 2019-140114 filed on Jul. 30, 2019, the disclosure of which is incorporated by reference herein.

BACKGROUND

Technical Field

The present disclosure relates to an operation selection device that selects a remote-control operation in order to enable a vehicle to be driven via remote-control.

Related Art

In, for example, Japanese Unexamined Patent Application (JP-A) No. 2018-77649, a vehicle control system is disclosed that enables a suitable remote-control operator to execute remote-control driving. This vehicle control system is provided with a plurality of remote-control operating devices that receive remote-control operations, and an integrated control device that is connected to the plurality of remote-control operating devices. The integrated control device acquires information about remote-control operators from each of the plurality of remote-control devices, and if a remote-control operator who satisfies predetermined conditions is present, selects a single remote-control operator.

In the integrated control device disclosed in JP-A No. 2018-77649, a remote-control operator is selected based on past remote-control operations. However, according to the selection method employed by this integrated control device, depending on the situation in which the remote-control driving is being performed, there may arise cases in which the remote-control operation of the selected remote-control driver is unsuitable. In other words, although a remote-control driver is selected by this integrated control device, because this integrated control device does not select the actual remote-control operation, there is a possibility that remote-control driving will be performed via remote a control operation that might not be the most suitable.

SUMMARY

The present disclosure provides an operation selection device that, by selecting the optimum remote-control operation for a situation in which remote-control driving is to be performed, makes it possible to inhibit a vehicle from making an emergency stop or from repeating a remote-control operation, and also enables the remote-control driving of a large number of vehicles to be performed by a small number of remote-control drivers.

An operation selection device of a first aspect is provided with a communication unit that performs communication between a self-driving device that is provided at a vehicle which performs self-driving, and a plurality of operating devices that enable the vehicle to be driven remotely via a remote-control operation performed by a remote-control driver, and that are individually provided for each of a plurality of remote-control drivers, an acquisition unit that acquires information relating to remote-control operations performed by each remote-control driver using each of the plurality of operating devices for an event receiving remote-control operation in the vehicle currently being driven via remote-control, a deciding unit that decides, using a predetermined weighting, one remote-control operation among a plurality of remote-control operations acquired by the acquisition unit, an output unit that outputs to the vehicle information relating to the remote-control operation that has been decided on by the deciding unit, and an allocation unit that allocates a score, which is reflected in the weighting, in the deciding unit to the remote-control driver who performed the remote-control operation that has been decided on by the deciding unit.

The operation selection device of the first aspect enables communication to be performed via a communication unit between a self-driving device that is provided at a vehicle, and a plurality of operating devices. One of these operating devices is provided for each of a plurality of remote-control drivers. The vehicle is capable of executing both self-driving which is achieved via a self-driving device, and remote-control driving which is achieved via a remote-control operation performed by a remote-control driver using an operating device. In addition, in this operation selection device, an acquisition unit acquires information relating to remote-control operations performed by each remote-control driver using each of the plurality of operating devices relating to an event receiving remote-control operation, and a deciding unit decides, using a predetermined weighting, one remote-control operation among a plurality of acquired remote-control operations. Here, examples of 'an event receiving remote-control operation' include when a request for remote-control driving is received from a vehicle occupant, and, in a situation requiring remote-control driving, when a command to start or stop a vehicle, or to overtake another vehicle or the like is received. Moreover, as a result of an output unit outputting information relating to a remote-control operation which has been decided on to a vehicle, the vehicle performs remote-control driving in accordance with this remote-control operation.

Furthermore, in this operation selection device, a score that is reflected in the weighting in the deciding unit is allocated to the remote-control driver who performed the remote-control operation that has been decided on by the deciding unit. As a result, the deciding unit enables the skill level of the remote-control operation to be reflected in the decision about the next remote-control operation. According to this operation selection device, by selecting a suitable remote-control operation for a situation requiring remote-control driving, it is possible to reduce the number of times a vehicle makes an emergency stop or needs to repeat a remote-control operation, and it is possible for a large number of vehicle remote-control driving operations to be performed by a small number of remote-control drivers.

An operation selection device of a second aspect is characterized in that, in the operation selection device of the first aspect, the communication unit receives, from the self-driving device, information relating to an autonomous operation which is required to perform the self-driving and that was created for the event, and the deciding unit decides on one operation among the plurality of remote-control operations and the autonomous operation, using a predetermined weighting, and, when the remote-control operation has been decided on by the deciding unit, the output unit outputs information relating to that remote-control operation to the vehicle.

In the operation selection device of the second aspect, in the decision made by the deciding unit, by adding an autonomous operation from the self-driving device in addition to the plurality of remote-control operations, even if an acquired remote-control operation is not the most suitable remote-control operation, it is still possible for a vehicle to travel using self-driving.

An operation selection device of a third aspect is characterized in that, in the operation selection device of the first aspect, the deciding unit alters a weighting in accordance with the score belonging to the remote-control driver and the mode of the remote-control operation.

In the operation selection device of the third aspect, the deciding unit decides one operation in accordance with the score belonging to the remote-control driver and the mode of the remote-control operation. According to this operation selection device, the skill level of the remote-control driving by the remote-control driver and the quality of the current remote-control operation can be reflected in the decision about the operation. Because of this, the optimum operation for the vehicle can be provided.

An operation selection device of a fourth aspect is characterized in that, in the operation selection device of the first aspect, when an incorrect operation is contained in the remote-control operations, the deciding unit decides on the one operation after removing the incorrect operation.

According to the operation selection device of the fourth aspect, because the deciding unit decides on the one operation after having removed any incorrect operations, it is possible to inhibit the risk of an accident that might be caused by an incorrect operation during remote-control driving.

An operation selection device of a fifth aspect is characterized in that, in the operation selection device of the first aspect, the deciding unit alters the weighting such that the higher the score of the remote-control driver, a greater the number of vehicles performing a remote-control operation that are allocated to that driver.

According to the operation selection device of the fifth aspect, by allocating a greater number of vehicles which are performing an operation proportionally to those remote-control drivers having more experience, the remote-control driving of a large number of vehicles can be performed efficiently by a small number of remote-control drivers.

An operation selection device of a sixth aspect is characterized in that, in the operation selection device of the first aspect, the deciding unit alters the weighting in accordance with an area and time of occurrence of the event.

According to the operation selection device of the sixth aspect, by reflecting the situation in which remote-control driving is performed, such as the area where, and time when, an event occurred, in the operation decision made by the deciding unit, the remote-control driving of a large number of vehicles can be performed efficiently by a small number of remote-control drivers.

According to the present disclosure, by selecting the optimum remote-control operation for a situation in which remote-control driving is performed, it is possible to inhibit a vehicle from making an emergency stop or from repeating a remote-control operation, and it is possible for the remote-control driving of a large number of vehicles to be performed by a small number of remote-control drivers.

BRIEF DESCRIPTION OF THE DRAWINGS

Exemplary embodiments of the present disclosure will be described in detail based on the following figures, wherein:

FIGS. 8A, 8B, and 8C are views illustrating operator tables of the first exemplary embodiment, and respectively show different examples thereof;

FIG. 11 is a flow chart showing a flow of decision processing in the first exemplary embodiment;

FIG. 12A is an example of an allocated mode score in the decision processing of the first exemplary embodiment;

FIG. 12B is an example of a calculated determination value in the decision processing of the first exemplary embodiment;

FIGS. 13A and 13B are views illustrating operator tables of a second exemplary embodiment, and respectively show examples thereof.

DETAILED DESCRIPTION

First Exemplary Embodiment

Figure 1:
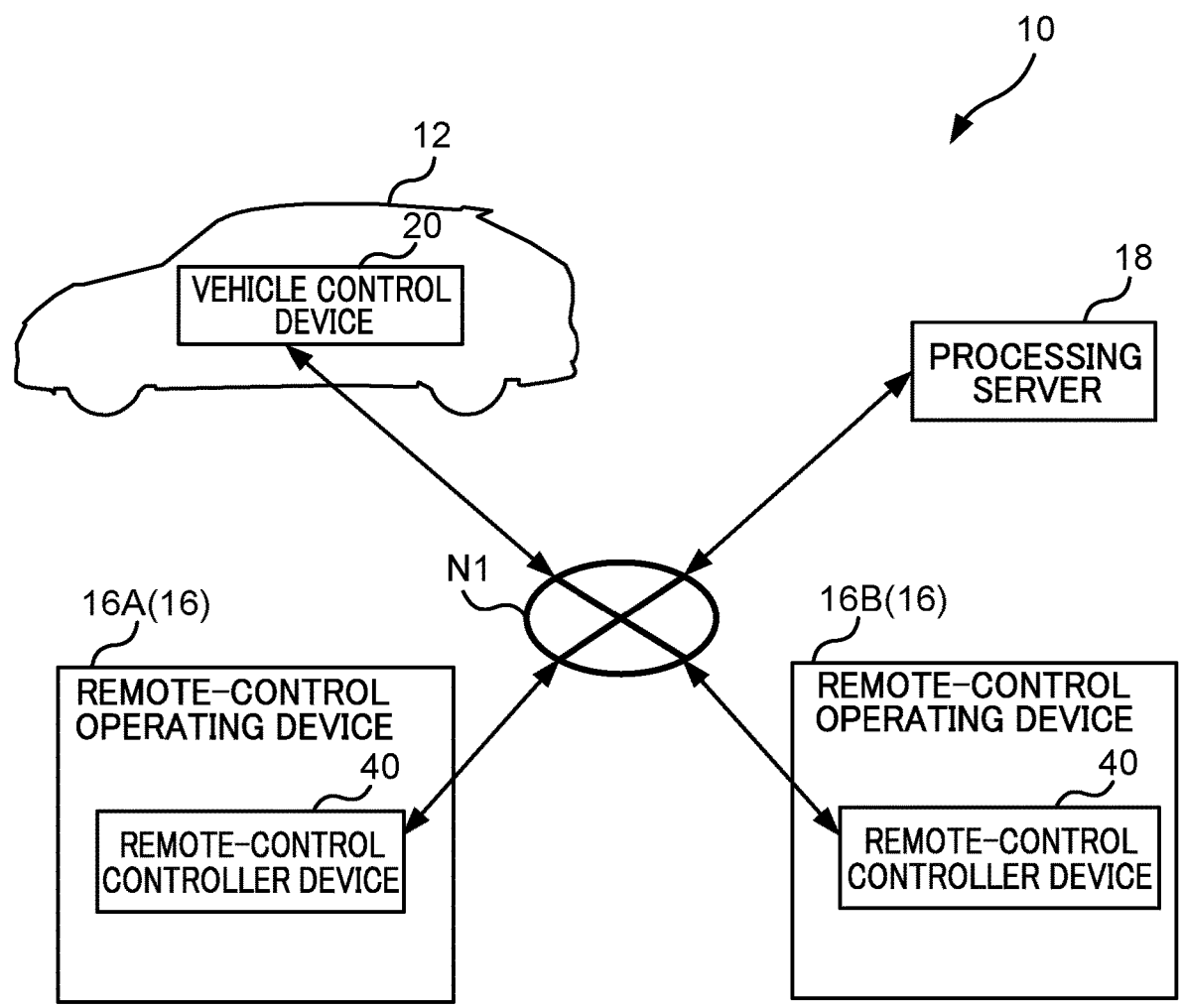
FIG. 1 is a view showing a schematic structure of a vehicle control system according to a first exemplary embodiment.

FIG. 1 is a block diagram showing a schematic structure of a vehicle control system 10 according to a first exemplary embodiment.

[Outline]

As is shown in FIG. 1, the vehicle control system 10 according to the first exemplary embodiment is configured to include a vehicle 12 which is a self-driving vehicle, a plurality of remote-control operating devices 16 which serve as operating devices, and a processing server 18 which serves as an operation selection device. The remote-control operating devices 16 include a remote-control operating device 16A and a remote-control operating device 16B.

The vehicle 12 of the present exemplary embodiment is provided with a vehicle control device 20 which serves as a self-driving device, and the remote-control operating device 16A and remote-control operating device 16B are each provided with a remote-control controller device 40. Additionally, in the vehicle control system 10, the vehicle control device 20 of the vehicle 12, the remote-control controller device 40 of the remote-control operating device 16A, and the remote-control controller device 40 of the remote-control operating device 16B are mutually interconnected via a network N1.

Note that the vehicle control system 10 shown in FIG. 1 is formed by the single vehicle 12, and two remote-control operating devices 16, however, the numbers of vehicles and remote-control operating devices are not limited to these. The vehicle control system 10 may instead include two or more vehicles 12, and three or more remote-control operating devices 16.

The vehicle 12 is configured to be able to execute self-driving in which the vehicle 12 travels autonomously based on a travel plan created in advance by the vehicle control device 20, remote-control driving in which the vehicle 12 travels based on operations performed by an operator who is a remote-control driver using a remote-control operating device 16, and manual driving in which the vehicle 12 travels based on operations performed by an occupant (in other words, by the driver) of the vehicle 12. Note that the remote-control operations of the present exemplary embodiment involve issuing commands causing the vehicle 12 to start moving, stop moving, select a travel course, and travel at a certain speed, and the like, and the remote-control driving of the present exemplary embodiment corresponds to self-driving which is performed based on these commands, in other words, corresponds to semi-self-driving.

In the present exemplary embodiment, while the vehicle 12 is being driven manually, the processing server 18 acquires remote-control operation information (described below) from each one of the plurality of remote-control operating devices 16 each time a request for remote-control driving is received from an occupant of the vehicle 12, and then decides on one operation. For example, if an occupant of the vehicle 12 which is being driven manually on a normal road enters an interchange for an expressway and is not confident about merging into the main lane of the expressway, then the vehicle occupant may request remote-control driving. In this case, based on their own judgment, a plurality of operators each issues commands relating to the timing of the merger into the main lane or to the vehicle speed or the like as the remote-control operation. The processing server 18 then acquires each remote-control operation, and decides on a remote-control operation that will enable the merger to be performed smoothly and safely as being the remote-control operation that will perform the remote-control driving.

The vehicle control device 20 is configured to acquire remote-control operation information which relates to the operation that has been decided on by the processing server 18, and to then perform the remote-control driving of the vehicle 12 based on this acquired remote-control operation information.

(Vehicle)

Figure 2:
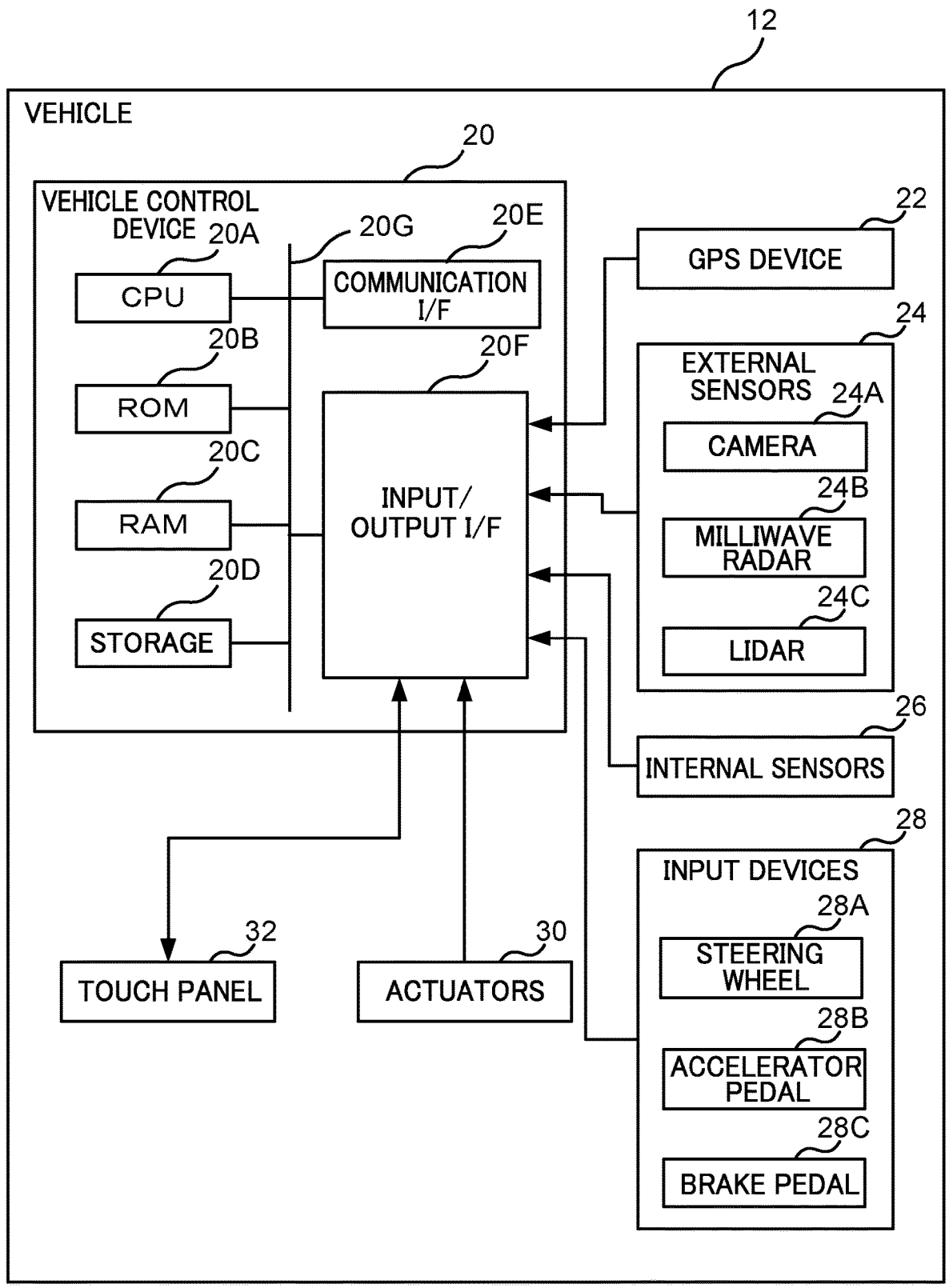
FIG. 2 is a block diagram showing a hardware structure of the vehicle of the first exemplary embodiment.

FIG. 2 is a block diagram showing a hardware structure of devices mounted in the vehicle 12 of the present exemplary embodiment. In addition to the above-described vehicle control device 20, the vehicle 12 also includes a GPS (Global Positioning System) device 22, external sensors 24, internal sensors 26, input devices 28, actuators 30, and a touch panel 32.

The vehicle control device 20 is configured to include a CPU (Central Processing Unit) 20A, ROM (Read Only Memory) 20B, RAM (Random Access memory) 20C, storage 20D, a communication I/F (Interface) 20E, and an input/output I/F 20F. The CPU 20A, the ROM 20B, the RAM 20C, the storage 20D, the communication I/F 20E, and the input/output I/F 20F are mutually connected so as to be able to communicate with each other via a bus 20G.

Figure 3:
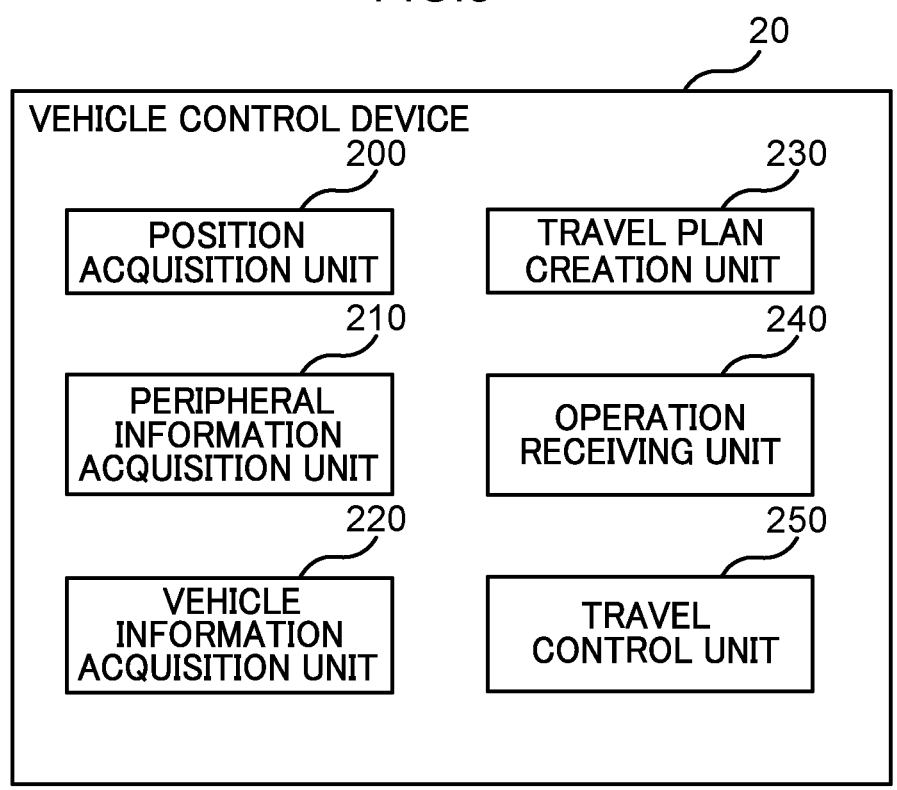
FIG. 3 is a block diagram showing an example of a functional structure of a vehicle control device according to the first exemplary embodiment.

The CPU 20A executes various types of programs, and controls the respective units. In other words, the CPU 20A reads a program from the ROM 20B, and executes this program using the RAM 20C as a workspace. In the present exemplary embodiment, execution programs are stored in the ROM 20B. As a result of the CPU 20A executing execution programs, the vehicle control device 20 is able to function as a position acquisition unit 200, a peripheral information acquisition unit 210, a vehicle information acquisition unit 220, a travel plan creation unit 230, an operation receiving unit 240, and a travel control unit 250 which are shown in FIG. 3.

As is shown in FIG. 2, the ROM 20B stores various types of programs and various types of data. The RAM 20C serves as a workspace and temporarily stores programs and data.

The storage 20D is formed by an HDD (Hard Disk Drive) or an SSD (Solid State Drive), and stores various types of programs including operating systems, and various types of data.

The communication I/F 20E includes an interface that is used for connecting to the network N1 in order to communicate with other vehicle control devices 20, remote-control controller devices 40, and the processing server 18. This interface utilizes a communication Standard such as, for example, 5G LTE, or Wi-Fi (Registered Trademark).

The communication I/F 20E of the present exemplary embodiment transmits acquisition images acquired by a camera 24A to the external remote-control operating device 16 of a vehicle 12 via the network N1, and receives, from the remote-control operating device 16, remote-control operation information, which is operation information that is used to operate the vehicle 12.

The input/output I/F 20F is an interface that is used in order to perform communication between the respective devices mounted in the vehicle 12. The vehicle control device 20 of the present exemplary embodiment is connected via the input/output I/F 20F to the GPS device 22, the external sensors 24, the internal sensors 26, the input devices 28, the actuators 30, and the touch panel 32. Note that the GPS device 22, the external sensors 24, the internal sensors 26, the input devices 28, the actuators 30, and the touch panel 32 may also be directly connected to the bus 20G.

The GPS device 22 is a device that measures a current position of the vehicle 12. The GPS device 22 includes an antenna (not shown in the drawings) that receives signals from GPS satellites.

The external sensors 24 which are serving as a peripheral information detecting unit are a group of sensors that detect peripheral information about the periphery of the vehicle 12. The external sensors 24 include the camera 24A that acquires images within a predetermined range, a milliwave radar 24B that receives radiation waves, and a LIDAR (Laser Imaging Detecting And Ranging) 24C that scans a predetermined range.

The internal sensors 26 are a group of sensors that detect the traveling state of the vehicle 12. The internal sensors 26 include at least one of a vehicle speed sensor, an acceleration sensor, and a yaw rate sensor.

The input devices 28 are a group of switches that are provided for a vehicle occupant who is on board the vehicle 12 to operate. The input devices 28 include a steering wheel sensor 28A which serves as switch enabling a steering wheel of the vehicle 12 to be steered, an accelerator pedal 28B which serves as a switch for causing the vehicle 12 to accelerate, and a brake pedal 28C which serves as a switch for causing the vehicle 12 to decelerate.

The actuators 30 include a steering wheel actuator that drives the steering wheel of the vehicle 12, an accelerator actuator that controls the acceleration of the vehicle 12, and a brake actuator that controls the deceleration of the vehicle 12.

The touch panel 32 is a device that provides information to the occupant of the vehicle 12 via their sense of sight, and receives operations relating to the settings of the vehicle 12. The touch panel 32 is formed by combining a liquid crystal display which serves as a display device, together with a touch pad which serves as an input device.

FIG. 3 is a block diagram showing an example of a function structure of the vehicle control device 20. As is shown in FIG. 3, the vehicle control device 20 has the position acquisition unit 200, the peripheral information acquisition unit 210, the vehicle information acquisition unit 220, the travel plan creation unit 230, the operation receiving unit 240, and the travel control unit 250. Each function structure is achieved as a result of the CPU 20A reading an execution program stored in the ROM 20B and then executing this execution program.

The position acquisition unit 200 has a function of acquiring he current position of the vehicle 12. The position acquisition unit 200 acquires position information from the GPS device 22 via the input/output I/F 20F.

The peripheral information acquisition unit 210 has a function of acquiring peripheral information for the periphery of the vehicle 12. The peripheral information acquisition unit 210 acquires peripheral information for the vehicle 12 from the external sensors 24 via the input/output I/F 20F. This peripheral information is not limited to information about other vehicles or pedestrians peripheral to the vehicle 12, and includes the weather, brightness, travel course width, and obstacles and the like.

The vehicle information acquisition unit 220 has a function of acquiring vehicle information such as the vehicle speed, acceleration, and yaw rate and the like of the vehicle 12. The vehicle information acquisition unit 220 acquires vehicle information for the vehicle 12 from the internal sensors 26 via the input/output I/F 20F.

The travel plan creation unit 230 has a function of creating a travel plan that is used to enable the vehicle 12 to travel based on the position information acquired by the position acquisition unit 200, the peripheral information acquired by the peripheral information acquisition unit 210, and the vehicle information acquired by the vehicle information acquisition unit 220. The travel plan is formed not only by a preset travel route to a destination, but additionally includes a course that avoids obstacles in front of the vehicle 12, and information about the speed and the like of the vehicle 12. In addition, the travel plan creation unit 230 creates vehicle operation information relating to autonomous operations as the operation information that is used to control the actuators 30 based on the travel plan.

When manual driving is being performed based on operations performed by an occupant of the vehicle 12, the operation receiving unit 240 has a function of receiving signals output from the respective input devices 28. The operation receiving unit 240 creates vehicle operation information relating to operations performed by the vehicle occupant as the operation information that is used to control the actuators 30 based on the signals received from the respective input devices 28.

The travel control unit 250 has functions of controlling self-driving based on the travel plan and the autonomous operation created by the travel plan creation unit 230, of controlling remote-control driving based on the remote-control operation information received from the remote-control operating devices 16, and of controlling manual driving based on the vehicle operation information received from the operation receiving unit 240. In addition, if a request for remote-control driving via a remote-control operation is received from an occupant of the vehicle 12 while the vehicle 12 is being driven manually, then the travel control unit 250 transmits a remote-control operation request command to each remote-control operating device 16. Operation reception processing (described below) is then executed in each of the remote-control operating devices 16 that has received this remote-control operation request command.

(Remote-Control Operating Devices)

Figure 4:
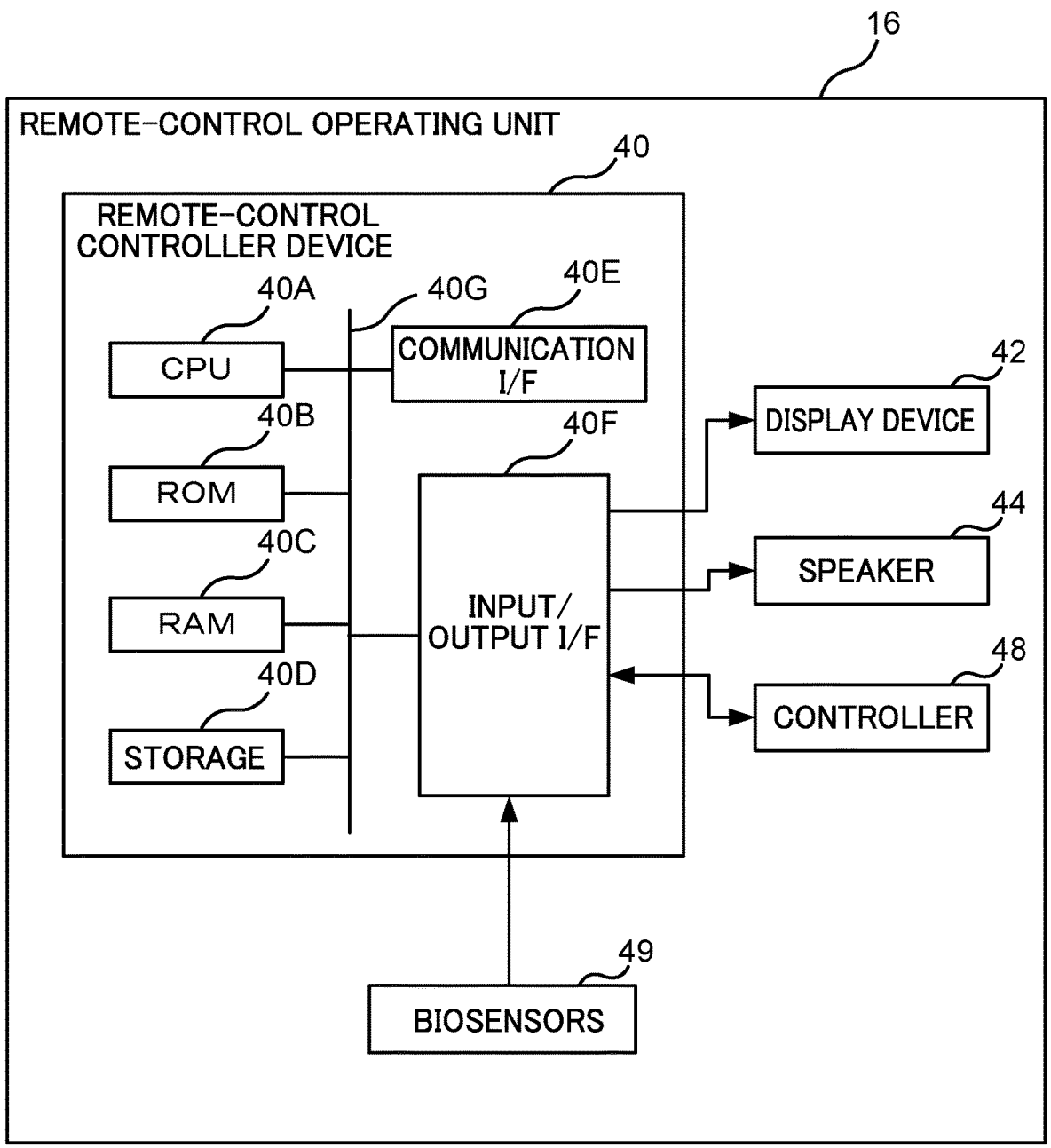
FIG. 4 is a block diagram showing a hardware structure of a remote-control operating device of the first exemplary environment.

FIG. 4 is a block diagram showing a hardware structure of devices that are mounted in the remote-control operating devices 16 of the present exemplary embodiment. In addition to the above-described remote-control controller device 40, the remote-control operating devices 16 include a display unit 42, a speaker 44, controllers 48 which serve as operating units, and biosensors 49.

The remote-control controller device 40 is configured to include a CPU 40A, ROM 40B, RAM 40C, storage 40D, a communication I/F 40E, and an input/output I/F 40F. The CPU 40A, the ROM 40B, the RAM 40C, the storage 40D, the communication I/F 40E, and the input/output I/F 40F are mutually connected so as to be able to communicate with each other via a bus 40G The functions of the CPU 40A, the ROM 40B, the RAM 40C, the storage 40D, the communication I/F 40E, and the input/output I/F 40F are the same as those of the CPU 20A, the ROM 20B, the RAM 20C, the storage 20D, the communication I/F 20E, and the input/output I/F 20F of the above-described vehicle control device 20.

Figure 5:
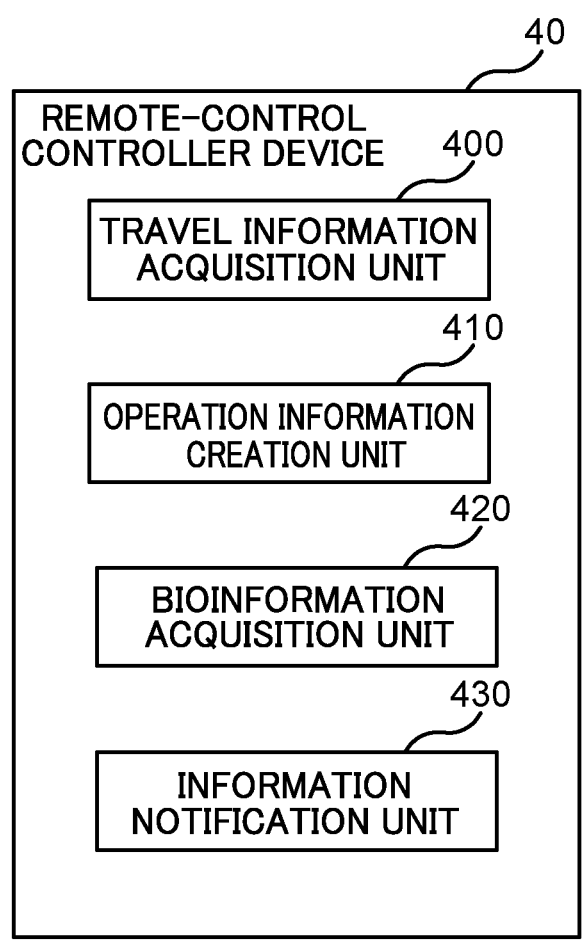
FIG. 5 is a block diagram showing an example of a functional structure of a remote-control controller device of the first exemplary embodiment.

The CPU 40A reads a program from the ROM 40B, and executes this program using the RAM 40C as a workspace. In the present exemplary embodiment, processing programs are stored in the ROM 40B. As a result of the CPU 40A executing these processing programs, the remote-control controller device 40 functions as a travel information acquisition unit 400, an operation information creation unit 410, a bioinformation acquisition unit 420, and an information notification unit 430 which are shown in FIG. 5.

The display unit 42, the speaker 44, the controllers 48, and the biosensors 49 are connected via the input/output I/F 42 to the remote-control controller device 40 of the present exemplary embodiment. Note that the display unit 42, the speaker 44, the controllers 48, and the biosensors 49 may also be directly connected to the bus 40G.

The display unit 42 is a liquid crystal monitor that is used to display images acquired by the camera 24A of the vehicle 12, and various types of information relating to the vehicle 12.

The speaker 44 reproduces audio recorded together with the acquisition images by a microphone (not shown in the drawings) incorporated into the camera 24A of the vehicle 12.

The controllers 48 are controllers that are operated by an operator who is serving as a remote-control driver utilizing the remote-control operating device 16. The controllers 48 have functions of issuing commands causing the vehicle 12 to start moving, stop moving, select a travel course, and travel at a certain speed, and the like, and are formed by push-button switches or lever switches or the like. Note that the forms of each controller 48 are not limited to these. For example, the controllers 48 may also include a steering wheel which serves as switch enabling a steering wheel of the vehicle 12 to be steered, an accelerator pedal which serves as a switch for causing the vehicle 12 to accelerate, and a brake pedal which serves as a switch for causing the vehicle 12 to decelerate.

The biosensors 49 are sensors that acquire bioinformation about the operator using the remote-control operating device 16. The biosensors 49 include known types of sensor such as, for example, a heart rate sensor, a body temperature sensor, a blood pressure sensor, a motion sensor, a sight-line detecting camera, and an activity meter and the like.

FIG. 5 is a block diagram showing an example of a function structure of the remote-control controller device 40. As is shown in FIG. 5, the remote-control controller device 40 has the travel information acquisition unit 400, the operation information creation unit 410, the bioinformation acquisition unit 420, and the information notification unit 430.

The travel information acquisition unit 400 has a function of acquiring acquisition images and audio from the camera 24A that have been transmitted from the vehicle control device 20, as well as vehicle information such as the vehicle speed and the like. The acquired acquisition images and vehicle information are displayed on the display unit 42, and the audio information is output from the speaker 44.

The operation information creation unit 410 has a function of receiving signals output from the controller 48 when remote-control driving is being performed based on operations performed by an operator. Additionally, each time the operation information creation unit 410 receives a remote-control operation request command from the vehicle control device 20, it creates remote-control operation information based on signals received from the controller 48.

The bioinformation acquisition unit 420 has a function of acquiring bioinformation about the operators detected by the biosensors 49. The bioinformation acquisition unit 420 converts the bioinformation acquired from the biosensors 49 into predetermined physical quantities, and stores these in one of the ROM 40B, the RAM 40C, or the storage 40D. Additionally, the bioinformation acquisition unit 420 calculates the alertness of the operators based on the acquired bioinformation.

The information notification unit 430 has a function of providing notification about remote-control operation information created by the operation information creation unit 410, bioinformation acquired by the bioinformation acquisition unit 420, and the alertness that was calculated based on the relevant bioinformation, as well as the number of vehicles capable of being processed by an operator. Here, the number of vehicles capable of being processed is the number of vehicles 12 on which an operator who is operating the remote-control operating device 16 is capable of performing remote-control operation processing within a predetermined time period. For example, in a situation in which the processing to make a left turn requires remote-control driving, then the number of vehicles capable of being processed is the number of vehicles 12 turning left that are capable of being processed within a unit time. As another example, in a situation in which the processing to overtake another vehicle requires remote-control driving, then the number of vehicles capable of being processed is the number of overtaking vehicles 12 that are capable of being processed within a unit time.

(Processing Server)

Figure 6:
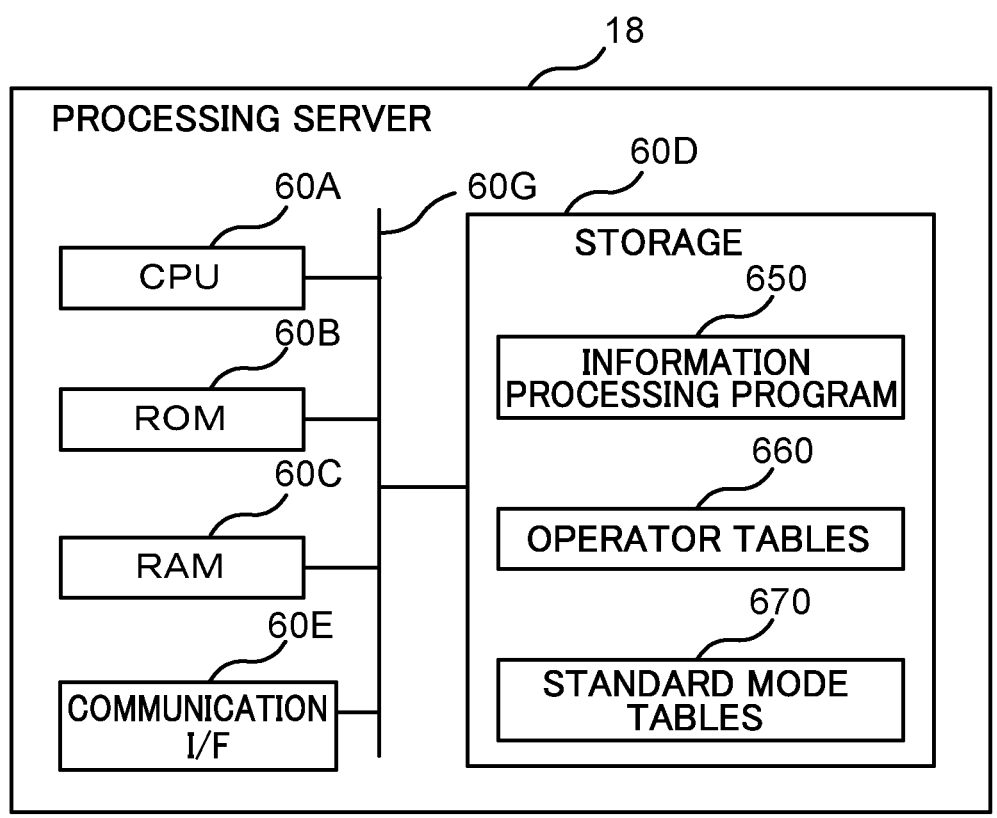
FIG. 6 is a block diagram showing a hardware structure of a processing server of the first exemplary embodiment.

As is shown in FIG. 6, the processing server 18 is configured to include a CPU 60A, ROM 60B, RAM 60C, storage 60D, and a communication I/F 60E. The CPU 60A, the ROM 60B, the RAM 60C, the storage 60D, and the communication I/F 60E are mutually connected so as to be able to communicate with each other via a bus 60G. The functions of the CPU 60A, the ROM 60B, the RAM 60C, the storage 60D, and the communication I/F 60E are the same as those of the CPU 20A, the ROM 20B, the RAM 20C, the storage 20D, and the communication I/F 20E of the above-described vehicle control device 20. Here, the communication I/F 60E corresponds to a communication unit.

Figure 7:
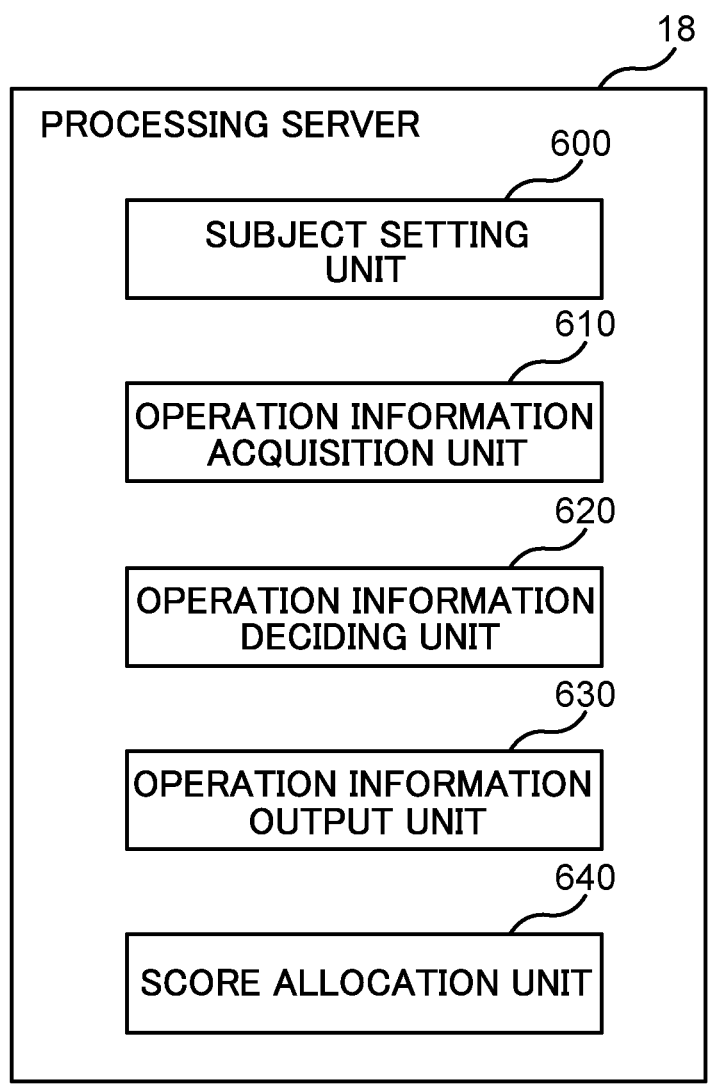
FIG. 7 is a block diagram showing an example of a functional structure of the processing server of the first exemplary embodiment.

The CPU 60A which serves as processor reads programs from the ROM 60B which serves as a memory or from the storage 60D which serves as a memory, and then executes these programs using the RAM 60C as a workspace. In the present exemplary embodiment, an information processing program 650 is stored in the storage 60D. As a result of the CPU 60A executing the information processing program 650, the CPU 60A functions as a subject setting unit 600, an operation information acquisition unit 610, an operation information deciding unit 620, an operation information output unit 630, and a score allocation unit 640 which are shown in FIG. 7. Additionally, operator tables 660 and standard mode tables 670 are stored in the storage 60D of the present exemplary embodiment.

As is shown in FIG. 8A through FIG. 8C, in the operator tables 660, individual scores, which are the scores of each operator, and the number of vehicles capable of being processed and the like are stored for each operator in the operator tables 660. These operator tables 660 are prepared for individual predetermined regions and predetermined time periods.

For example, as is shown in FIG. 8A, individual scores and number of vehicles capable of being processed for eight operators, namely, the operators A through H are stored in an operator table 660 whose remote-control operation subject is a time period from 09:00 to 18:00 in Nagoya City. As another example, as is shown in FIG. 8B, individual scores and number of vehicles capable of being processed for the eight operators A through H are stored in an operator table 660 whose remote-control operation subject is a time period from 18:00 to 03:00 in Nagoya City. Note that, in FIG. 8B, a dash '-' is allocated to the operators A, D, and H who do not correspond to the time period from 18:00 to 03:00 in Nagoya City.

As another example, as is shown in FIG. 8C, individual scores and number of vehicles capable of being processed for the eight operators A through H are stored in an operator table 660 whose remote-control operation subject is a time period from 09:00 to 18:00 in Sendai City.

Standard modes for remote-control operations in each situation in which remote-control driving is performed are stored in the standard mode tables 670. For example, if a vehicle 12 is making a left turn via remote-control driving, then the timing for starting the left turn, and data relating to the vehicle speed and the like are stored as model examples in standard mode.

FIG. 7 is a block diagram showing an example of a function structure of the processing server 18. As is shown in FIG. 7, the processing server 18 has the subject setting unit 600, the operation information acquisition unit 610, the operation information deciding unit 620, the operation information output unit 630, and the score allocation unit 640.

The subject setting unit 600 has a function of setting a range of subject operators for performing a remote-control operation in one vehicle 12 which is to perform remote-control driving. For example, the subject setting unit 600 sets, as the subject for performing a remote-control operation, an operator who can be guaranteed to be able to perform a remote-control operation both currently and until a predetermined time in the future. As another example, the subject setting unit 600 sets, as the subject for performing a remote-control operation, an operator who is in a predetermined region relative to the vehicle 12 that is to be the subject of a remote-control operation. Moreover, the subject setting unit 600 refers to the number of vehicles capable of being processed by each operator in the operator tables 660, and when the number of vehicles currently being processed exceeds the number of vehicles capable of being processed by a particular operator, the subject setting unit 600 removes that operator from the subject range.

The operation information acquisition unit 610 which serves as an acquisition unit has a function of acquiring remote-control operation information from the plurality of remote-control operating devices 16 when an event receiving remote-control operation occurs in a particular vehicle 12. The plurality of remote-control operating devices 16 form the respective remote-control operating devices 16 used by the operators set by the subject setting unit 600 to perform an operation. Here, the term 'event receiving remote-control operation i' refers to the receiving of a request for remote-control driving to be performed from an occupant of a vehicle 12. For example, a remote-control driving request can be made by an occupant of a vehicle 12 operating the touch panel 32.

As the decision processing, the operation information deciding unit 620 which serves as a deciding unit has a function of deciding, using predetermined weightings, one remote-control operation among a plurality of remote-control operations acquired by the operating information acquisition unit 610 from each of the plurality of remote-control operating devices 16. Here, the term 'predetermined weightings' refers to weightings that correspond to the individual score of the operators and the mode of the remote-control operation.

The operation information deciding unit 620 selects an operator table 660 in accordance with the region in which the event receiving remote-control operation occurred, as well as the time thereof. In other words, the operation information deciding unit 620 alters the weighting in accordance with the region and the time of the event receiving remote-control operation occurred. Additionally, the operation information deciding unit 620 refers to the operator tables 660, and gives priority to assigning remote-control operations proportionally to those operators having the highest individual score.

Furthermore, when an incorrect operation is contained in the remote-control operations acquired by the operation information acquisition unit 610, the operation information deciding unit 620 firstly removes the incorrect operation, and then decides on an operation among a plurality of remote-control operations. It is also possible for the operation information deciding unit 620 to remove remote-control operations of operators having a low level of alertness, and to then decide on an operation among a plurality of remote-control operations.

The operation information output unit 630 which serves as an output unit has a function of outputting to the vehicle 12 information relating to remote-control operations decided on by the operation information deciding unit 620.

The score allocation unit 640 which serves as an allocation unit has a function of allocating an individual score which is reflected in the weightings in the operation information deciding unit 620 to operators who have performed a remote-control operation that has been decided on by the operation information deciding unit 620. Additionally, the score allocation unit 640 has a function of updating the individual scores of the respective operators which are stored in the operator tables 660.

(Control Flow)

In the present exemplary embodiment, when a vehicle 12 is performing manual driving, the following processing is executed prior to remote-control driving being requested, and also after remote-control driving has been requested. An example of the flow of processing performed between the respective devices will now be described using the sequence diagrams shown in FIG. 9 and FIG. 10. Note that in FIG. 9 and FIG. 10, only two remote-control operating devices 16 are shown, however, in actuality, more than two remote-control operating devices 16 are connected. In these drawings, the operator A is performing operations for the remote-control operating device 16A, and the operator B is performing operations for the remote-control operating device 16B.

Figure 9:
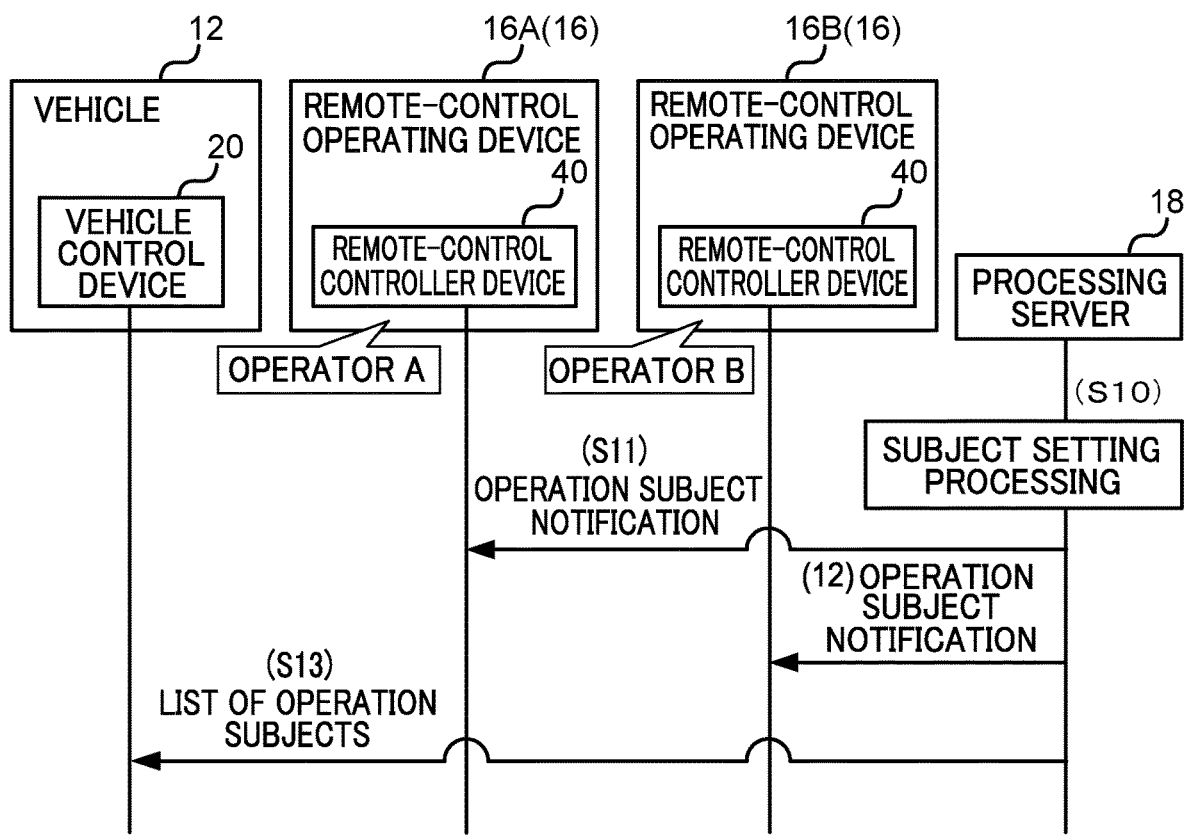
FIG. 9 is a sequence diagram showing a flow of processing between each device when an operation subject is decided on in the first exemplary embodiment.

In step S10 shown in FIG. 9, in the processing server 18, the CPU 60A executes subject setting processing in order to set an operator as the subject performing the remote-control operation in one vehicle 12 which is to be driven via remote-control. In this subject setting processing, the CPU 60A sets as the subject to perform the remote-control operation an operator who is associated with the remote-control operating device 16 within the relevant time period, and who is currently processing a number of vehicles that is less than the number of vehicles able to be processed by that operator as stipulated in the operator table 660.

For example, if a vehicle 12 is traveling within Nagoya city at 16:00, the CPU 60A selects the operator table 660 shown in FIG. 8A. The CPU 60A then sets an operator who is currently processing a number of vehicles that is less than the number of vehicles able to be processed by that operator as the subject to perform the remote-control operation.

In step S10, it is assumed that operator A and operator B are the subjects to perform a remote-control operation. In this case, in the processing server 18, the CPU 60A transmits an operation subject notification to the remote-control operating devices 16 of operator A and operator B showing that they have been selected as the subjects to perform the remote-control operation.

In other words, in step S11, in the processing server 18, the CPU 60A transmits an operation subject notification to the remote-control controller device 40 of the remote-control operating device 16A associated with operator A. In addition, in step S12, in the processing server 18, the CPU 60A transmits an operation subject notification to the remote-control controller device 40 of the remote-control operating device 16B associated with operator B.

In step S13, in the processing server 18, the CPU 60A transmits information relating to an operation subject list, which is a list of operators who have been selected as the subjects to perform the remote-control operation, to the vehicle control device 20 of the vehicle 12 that is to be driven via remote-control. The CPU 60A transmits this operation subject list each time the operators selected to perform the remote-control operation changes.

Figure 10:
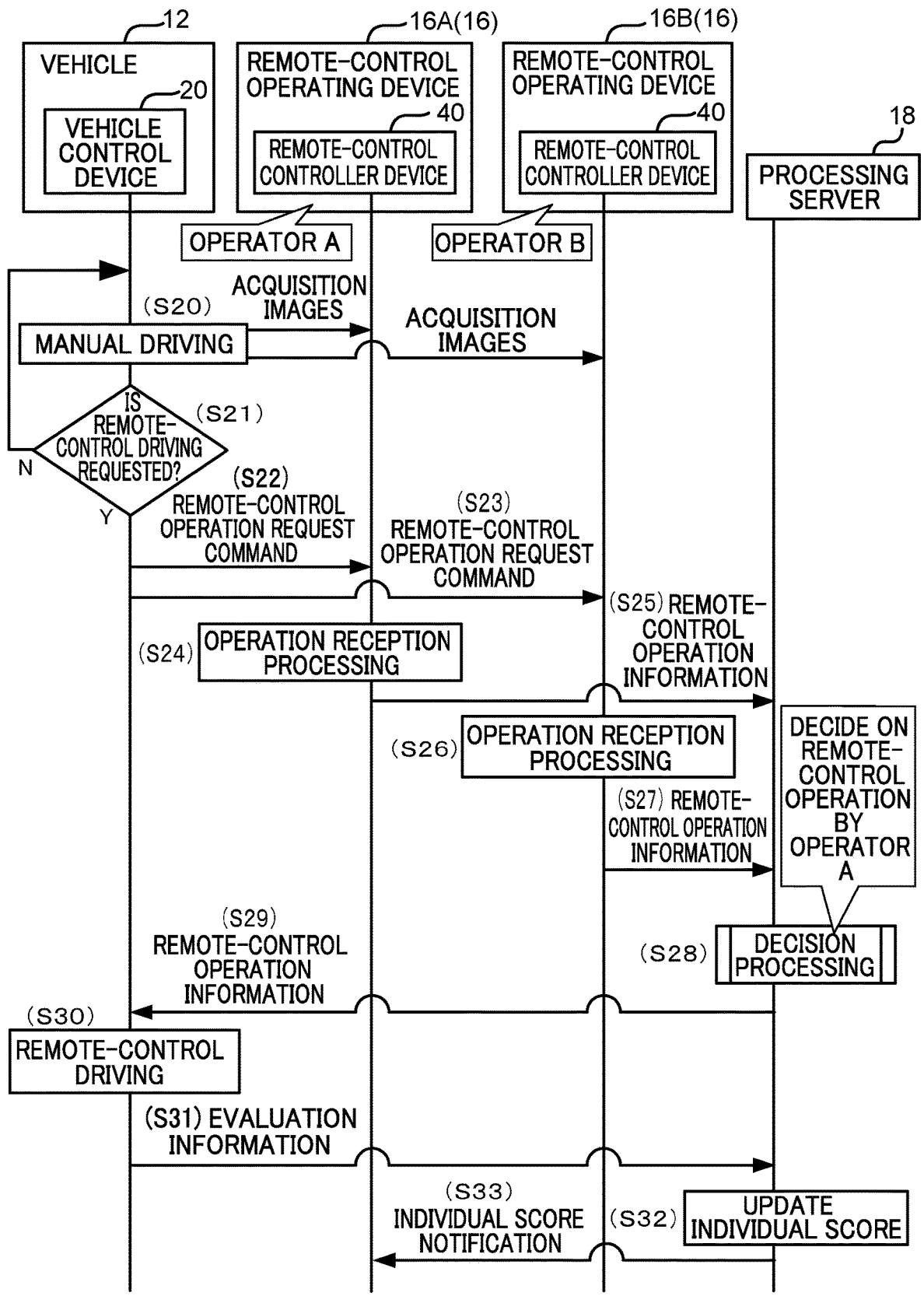
FIG. 10 is a sequence diagram showing a flow of processing between each device when remote-control driving is requested in the first exemplary embodiment.

In step S20 shown in FIG. 10, in the vehicle control device 20 that receives the operation subject list, the CPU 20A receives the operation performed by the occupant of the vehicle 12, and executes manual driving. At this time, the CPU 20A of the vehicle control device 20 transmits acquisition images acquired by the camera 24A to each remote-control operating device 16 associated with the operators selected as subjects for performing the remote-control operation.

In step S21, in the vehicle 12, the CPU 20A of the vehicle control device 20 determines whether or not a remote-control driving request has been received. An example of this in the present exemplary embodiment is when an occupant of the vehicle 12 who is performing manual driving on a normal road lacks confidence to merge into the main lane of an expressway when entering an interchange on that expressway, and consequently requests remote-control driving. In this case, the CPU 20A determines that a request for remote-control driving has been made if an occupant of the vehicle 12 has touched a button displaying a character string stating 'Request Remote-Control Driving' which is displayed on the touch panel 32. If the CPU 20A determines that a remote-control driving request has been received, it proceeds to the next step. In contrast, if the CPU 20A determines that a remote-control driving request has not been received, it returns to step S20 and continues the manual driving.

In step S22, the CPU 20A of the vehicle control device 20 transmits the remote-control operation request command, which is requesting a remote-control operation, to the remote-control operating device 16A associated with the operator A who is the subject of the remote-control operation.

In addition, in step S23, the CPU 20A of the vehicle control device 20 transmits the remote-control operation request command, which is requesting a remote-control operation, to the remote-control operating device 16B associated with the operator B who is the subject of the remote-control operation.

In step S24, the CPU 40A executes the operation reception processing in the remote-control controller device 40 of the remote-control operating device 16A that has received the remote-control operation request command. In this operation reception processing, the CPU 40A receives, as the remote-control operation, the command given by operator A to the controller 48. In other words, in the example of the present exemplary embodiment, a command for an operation relating to merging into the main lane of an expressway that was given by operator A to the controller 48 is received.

In step S25, the CPU 40A of the remote-control controller device 40 transmits the remote-control operation information that was created in conjunction with the operation reception processing to the processing server 18.

In step S26, the CPU 40A executes the operation reception processing in the remote-control controller device 40 of the remote-control operating device 16B that has received the remote-control operation request command. In this operation reception processing, the CPU 40A receives, as the remote-control operation, the command given by operator B to the controller 48. In other words, in the example of the present exemplary embodiment, a command for an operation relating to merging into the main lane of an expressway that was given by operator B to the controller 48 is received.

In step S27, the CPU 40A of the remote-control controller device 40 transmits the remote-control operation information that was created in conjunction with the operation reception processing to the processing server 18.

In step S28, the CPU 60A executes the decision processing in the processing server 18 that has received the remote-control operation information from the respective remote-control controller devices 40 of the remote-control operating devices 16. This decision processing is described below in greater detail. In the example used in the present exemplary embodiment, when the vehicle 12 is merging into the main lane of an expressway, one operation from the remote-control operation of operator A and the remote-control operation of operator B is decided on as the remote-control operation to be associated with the remote-control driving of the vehicle 12. In this decision processing, the following processing flow is described on the assumption that the remote-control operation performed by operator A has been decided on as the operation to be performed for the remote-control driving of the vehicle 12.

In step S29, the CPU 60A of the processing server 18 transmits remote-control operation information relating to the remote-control operation that has been decided on via the decision processing, in other words, remote-control operation information associated with operator A to the vehicle control device 20 of the vehicle 12.

In step S30, in the vehicle control device 20 of the vehicle 12, remote-control driving is executed based on the remote-control operation information received by the CPU 20A. In other words, in the example given in the present exemplary embodiment, the CPU 20A performs remote-control driving based on the remote-control operations performed by operator A, so that the vehicle 12 merges into the main lane of the expressway.

In step S31, in the vehicle control device 20 of the vehicle 12, the CPU 20A transmits to the processing server 18 evaluation information which shows an evaluation of the result of this remote-control driving which is based on the remote-control operations. More specifically, based on peripheral information and the like acquired by the external sensors 24, the CPU 20A evaluates whether or not the remote-control driving that was based on the remote-control operations was appropriate. For example, if, as a result of the remote-control driving that was based on the remote-control operations determined to be the most appropriate by the processing server 18 being performed, a problem is created in the traveling of the vehicle 12 requiring a deceleration or an emergency stop or the like, then the CPU 20A transmits evaluation information giving a poor evaluation to the processing server 18. In contrast, if, for example, as a result of the remote-control driving that was based on the remote-control operations determined to be the most appropriate by the processing server 18 being performed, no problem arises in the traveling of the vehicle 12, then the CPU 20A transmits evaluation information giving a good evaluation to the processing server 18.

In step S32, the CPU 60A of the processing server 18 alters the individual score of the operator who performed the remote-control operation that has been decided on in the decision processing. In the example given in the present exemplary embodiment, updating is executed to add to the individual score of the operator A. Note that when this updating is performed, the CPU 60A alters the individual score while taking into account the evaluation information received from the vehicle control device 20. In other words, if a poor evaluation is contained in the evaluation information, no addition is made to the individual score, while if a good evaluation is contained in the evaluation information, an addition is made to the individual score.

In step S33, the CPU 60A of the processing server 18 sends notification of the individual score to the remote-control operating device 16 associated with the operator whose individual score has been updated. In the example given in the present exemplary embodiment, notification of the individual score associated with the operator A is sent to the remote-control controller device 40 of the remote-control operating device 16A.

Next, the decision processing executed in the processing server 18 will be described using the flowchart shown in FIG. 11. In the example shown in FIG. 11, decision processing executed for remote-control operations performed by five operators, namely, the operators A through E is described.

In step S100 shown in FIG. 11, the CPU 60A acquires from the standard mode tables 670 a standard mode associated with the remote-control operation when remote-control driving has been requested. For example, if a left turn is to be made via remote-control driving, then data such as the timing for starting the left turn, and the vehicle speed and the like which are stored as model examples are acquired as data associated with the standard mode.

In step S101, the CPU 60A changes the mode of the remote-control operation associated with each item of remote-control operation information acquired from the respective remote-control controllers 40 into a mode score. For example, as is shown in FIG. 12A, when the decision processing is executed based on the remote-control operations performed by the five operators A through E, the CPU 60A compares the respective operation modes with a standard mode, and assigns a mode score (i.e., a numerical score) thereto. More specifically, the CPU 60A compares the vehicle speed, acceleration, and steering angle of the standard mode with the vehicle speed, acceleration, and steering angle of the vehicle 12 that are hypothesized when remote-control driving is performed based on the acquired remote-control operation. In the example shown in FIG. 12A, a progressively higher mode score is given as the remote-control operation more closely approximates the standard mode. If, however, the remote-control operation deviates from the standard mode, and an incorrect operation is performed that generates a remote-control operation which leads to the vehicle 12 being placed in a dangerous situation, then a negative mode score is given.

In step S102, the CPU 60A executes an initial determination. In this initial determination, the CPU 60A removes incorrect operations from the acquired plurality of remote-control operations. In the example shown in FIG. 12A, the remote-control operation of operator E who has been given a negative score is removed.

In step S103, the CPU 60A executes a weighting determination. In this weighting determination, the CPU 60A acquires the individual scores for each operator from the operator tables 660, and calculates a determination value (see (x y) in FIG. 12B) by multiplying the mode score (x in FIG. 12B) by the individual score (y in FIG. 12B) for each operator. Note that because the remote-control operations of operator E have been removed from the initial determination, they have also been removed as weighting determination subjects. Next, the CPU 60A decides that the remote-control operation of the operator who has the largest determination value will be the remote-control operation to be performed in the remote-control driving of the vehicle 12. For example, as is shown in FIG. 12B, although operator D has the highest mode score (9 points), and operator A has the highest individual score (210 points), the remote-control operation of operator B who has the highest determination value (1400 points) is decided on for this one operation. When the remote-control operation has been decided, the deciding processing is ended.

Summary of the First Exemplary Embodiment

The processing server 18 of the present exemplary embodiment is able to communicate with the vehicle control device 20 provided at each vehicle 12, and the remote-control controller device 40 provided at each one of the plurality of remote-control operating devices 16. In addition, the vehicle 12 is able to perform both self-driving and remote-control driving. Here, the processing server 18 acquires information relating to the remote-control operations performed by each one of the plurality remote-control operating devices 16 for an event receiving remote-control operation, and also decides on one operation out of the acquired plurality of remote-control operations using a predetermined weighting. This weighting takes the form of a mode score allocated as a result of a comparison made between an individual score which is allocated in accordance with the skill level of the remote-control operation, and a standard mode of the remote-control operation.

The processing server 18 decides on one operation in accordance with the individual scores of the operators and the mode of the remote-control operation. Consequently, as a result of the processing server 18 outputting information relating to the decided operation to the vehicle control device 20 of the vehicle 12, the vehicle 12 performs remote-control driving in accordance with this remote-control operation. According to the processing server 18 of the present exemplary embodiment, the skill level of the remote-control driving by the operator and the quality of the current remote-control operation can be reflected in the operation decision. Because of this, the optimum operation for the vehicle 12 can be provided.

According to the processing server 18 of the present exemplary embodiment, by selecting the optimum remote-control operation for a situation in which remote-control driving is to be performed, it is possible to inhibit a vehicle 12 from making an emergency stop or from repeating a remote-control operation, and it is also possible for a large number of vehicles 12 to be driven via remote-control by a small number of operators.

Moreover, an individual score that is reflected in the weightings when a remote-control operation is being decided on is allocated to the operator who performed the remote-control operation that was decided on this time. As a result, in the processing server 18, the skill level demonstrated in the current remote-control operation can be reflected in the decision about the next remote-control operation. Moreover, by allocating an individual score to each operator, an evaluation of each individual operator or an evaluation of a company to which an operator belongs can be achieved. In other words, an operator or a company having a highly rated evaluation can also obtain a highly rated reputation socially.

Moreover, operations to merge into a main lane of an expressway, or to perform a left turn which requires an oncoming traffic lane to be crossed, or to perform an overtaking maneuver which requires an entry into an oncoming traffic lane or the like all require a high level of proficiency. However, according to the present exemplary embodiment, by employing a structure in which one operation is decided on from the remote-control operations of a plurality of operators, then even if an operator having a low level of proficiency is included in the selection group, it is still possible to obtain the optimum operation for the vehicle 12. Additionally, according to the present exemplary embodiment, the risk of relying on the judgment of a single operator can be lowered.

Moreover, if an incorrect operation is contained in the remote-control operations performed by an operator, then the processing server 18 of the present exemplary embodiment is able to decide on an operation after having firstly removed the incorrect operation. In the present exemplary embodiment, for example, if, when a vehicle 12 is about to merge into the main lane of an expressway, a remote-control operation is performed that creates a risk of possible contact with another vehicle traveling in a vehicle lane, then this can be determined to be an incorrect operation and can be removed before being performed. Because of this, according to the present exemplary embodiment, it is possible to inhibit the risk of an accident occurring as the result of an incorrect operation performed during remote-control driving.

Moreover, according to the processing server 18 of the present exemplary embodiment, a structure is employed in which the higher the skill level of an operator in a remote-control operation and the higher the individual score thereof, the more frequently that operator is decided on as the subject to perform a remote-control operation to drive the vehicle 12 via remote-control. In other words, according to the processing server 18 of the present exemplary embodiment, by allocating vehicles 12 requiring a remote-control operation more frequently to those operators who have a greater degree of experience, the remote-control driving of a large number of vehicles 12 can be performed efficiently by a small number of operators.

Moreover, according to the processing server 18 of the present exemplary embodiment, by changing the operator tables 660 for each region and time period in which an event receiving a remote-control operation occurs, the situation in which the remote-control driving is performed can be reflected in the operation decision. As a result, in the present exemplary embodiment, because it is possible to accurately decide on the most appropriate remote-control operation, the remote-control driving of a large number of vehicles 12 can be performed efficiently by a small number of operators.

Furthermore, according to the processing server 18 of the present exemplary embodiment, an evaluation is made as to whether or not remote-control driving that was based on a remote-control operation that has been decided on via decision processing was appropriate. Additionally, in this decision processing, by suppressing any increase in the individual score of a particular operator who has performed a remote-control operation that could not be described as optimal, it is possible to improve the accuracy when deciding on the most appropriate remote-control operation in any subsequent decision processing.

Note that in the present exemplary embodiment, the evaluation as to whether or not remote-control driving which is based on a remote-control operation is appropriate is made based on peripheral information acquired from the external sensors 24 and the like, however, the present disclosure is not limited to this. For example, it is also possible for an occupant of the vehicle 12 to make an evaluation by operating the touch panel 32.

Moreover, in the subject setting processing (see step S10) of the present exemplary embodiment, an operator is set as the subject who is going to perform a remote-control operation, however, the present disclosure is not limited to this, and it is also possible to set the remote-control operating device 16 that receives the remote-control operation as the subject.

Second Exemplary Embodiment

In the second exemplary embodiment, it is assumed that a situation has occurred while a vehicle 12 is being self-driven that makes it difficult for this self-driving to continue and that, as a consequence, remote-control operation information is acquired from each of the plurality of remote-control operating devices 16, and one operation is then decided on. For example, a case is assumed in which a vehicle 12 is making a left turn at an intersection of a two-way road while traveling along the right side of this road, and circumstances that are difficult to predict such as the presence of a vehicle traveling in the oncoming lane, or a pedestrian crossing at a crosswalk ahead of the left turn, or traffic congestion on the road ahead of the left turn have arisen so that it is difficult for self-driving to continue. In this case, as the remote-control operation, a plurality of operators each make a judgment as to the timing when the left turn should be made. The processing server 18 then acquires the respective remote-control operations and decides, as the remote-control operation for performing the remote-control driving, which remote-control operation will enable the left turn to be made smoothly and safely. Hereinafter, how the second exemplary embodiment differs from the first exemplary embodiment will be described. Note that structure that is the same as in the first exemplary embodiment is given the same descriptive symbol and a detailed description thereof is omitted.

(Vehicle)

A travel control unit 250 of the present exemplary embodiment transmits a remote-control operation request command to each remote-control operating device 16 when a situation occurs during self-driving that makes it difficult for this self-driving to continue, and that therefore requires remote-control driving to be performed via a remote-control operation. Operation reception processing is executed in each of the remote-control operating devices 16 that receives this remote-control operation request command.

(Processing Server)

An operation information acquisition unit 610 of the present exemplary embodiment has a function of acquiring remote-control operation information from the plurality of remote-control operating devices 16 whenever an event receiving remote-control operation in a particular vehicle 12 occurs. The term 'an event receiving remote-control operation' in the present exemplary embodiment refers, in a situation requiring remote-control driving, to when a command to start or stop a vehicle 12, or to overtake another vehicle or the like is received. Moreover, in addition to the remote-control operation information acquired from each one of the plurality of remote-control operating devices 16, the operation information acquisition unit 610 of the present exemplary embodiment is also able to acquire information about its own autonomous operations relating to self-driving which is acquired from the vehicle control device 20 of the vehicle 12 which is performing the self-driving.

As the decision processing, the operation information deciding unit 620 of the present exemplary embodiment decides, using predetermined weightings, on one remote-control operation among not only the plurality of remote-control operations acquired by the operation information acquisition unit 610, but also from the operations including its own autonomous operation acquired from the vehicle control device 20 of the vehicle 12 performing the self-driving.

As is shown in FIG. 13A and FIG. 13B, the operator tables 660 of the present exemplary embodiment are prepared for various predetermined situations.

For example, as is shown in FIG. 13A, individual scores and number of vehicles capable of being processed for eight operators, namely, the operators A through H are stored in an operator table 660 whose remote-control operation subject is a left turn. As another example, as is shown in FIG. 13B, individual scores and number of vehicles capable of being processed for the eight operators A through H are stored in an operator table 660 whose remote-control operation subject is an overtaking maneuver.

(Control Flow)

In the present exemplary embodiment, the following processing is executed after the operator who is to be the subject performing the remote-control operation has been set (see FIG. 9), and it has been decided that self-driving in the vehicle 12 is difficult. An example of the flow of processing performed between the respective devices will now be described using the sequence diagram shown in FIG. 14.

Figure 14:
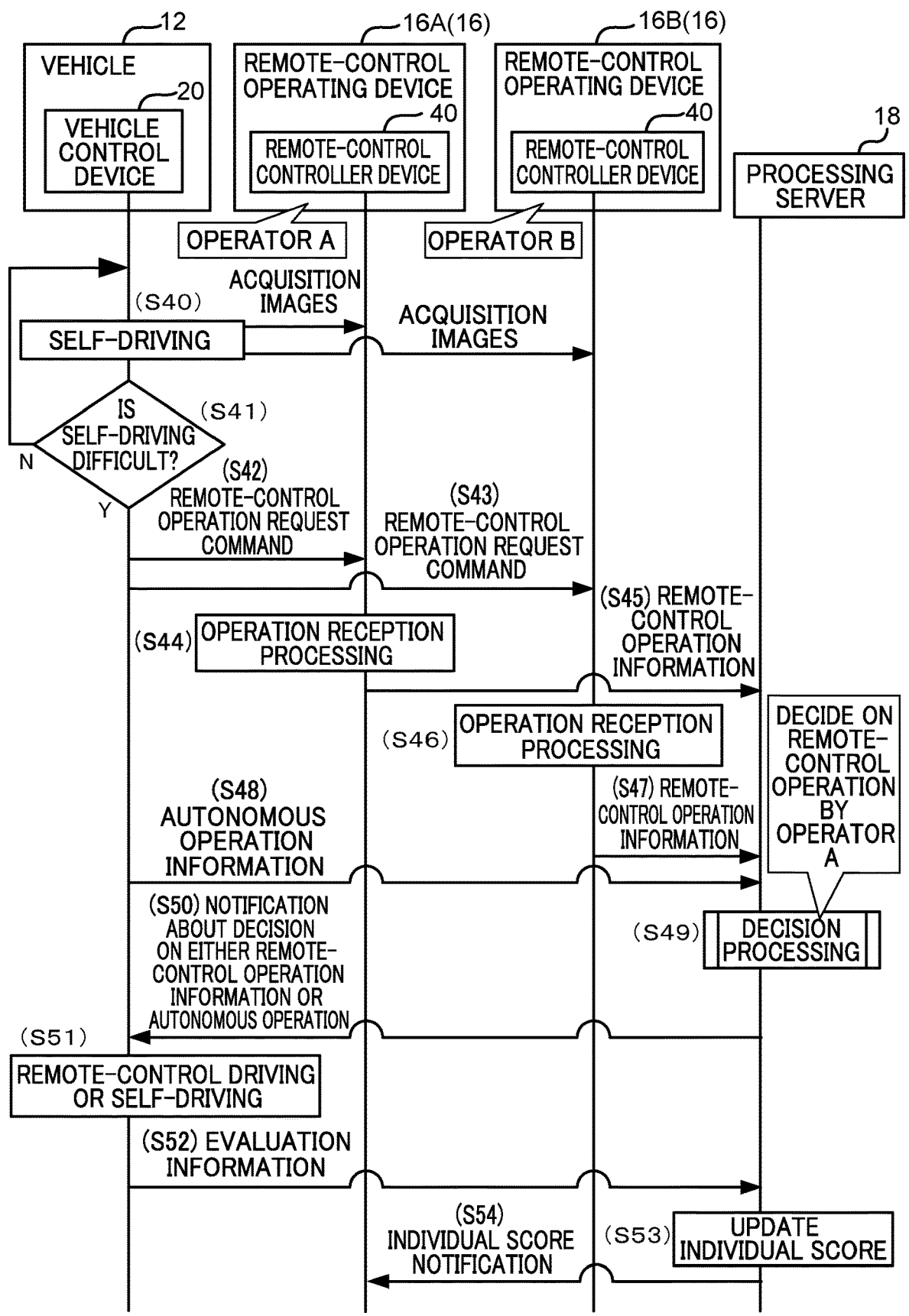
FIG. 14 is a sequence diagram showing a flow of processing between each device when self-driving is difficult in the second exemplary embodiment.

In step S40 shown in FIG. 14, in the vehicle control device 20 that has received the operation subject list, the CPU 20A executes self-driving of the vehicle 12. At this time, the CPU 20A of the vehicle control device 20 transmits acquisition images acquired by the camera 24A to each remote-control operating device 16 associated with the operators selected as subjects for performing a remote-control operation.

In step S41, in the vehicle 12, the CPU 20A of the vehicle control device 20 determines whether or not self-driving is difficult. More specifically, in a situation involving complex determination elements such as such as when making a left turn which requires an oncoming traffic lane to be crossed, or when performing an overtaking maneuver which requires an entry into an oncoming traffic lane or the like, the CPU 20A determines that self-driving will be difficult. Once the CPU 20A has determined self-driving to be difficult, the routine moves to the next step. If, on the other hand, the CPU 20 determines that self-driving will not be difficult, the routine returns to step S40 and self-driving is continued. As an example of this, in the present exemplary embodiment, the vehicle 12 enters a left-hand lane at an intersection in order to make a left turn, and comes to a stop together with a plurality of vehicles.

The processing flow from step S42 in FIG. 14 as far as step S47 is the same as the processing flow from step S22 in FIG. 10 as far as step S27.

Here, in step S44, in the example of the present exemplary embodiment, operator A receives the command for an operation relating to a left turn performed using the controller 48.

Additionally, in step S46, in the example of the present exemplary embodiment, operator B receives the command for an operation relating to a left turn performed using the controller 48.

In step S48, the CPU 20A of the vehicle control device 20 transmits to the processing server 18 information relating to the autonomous operation created on the premise that the vehicle 12 will perform self-driving. In the example given in the present exemplary embodiment, the vehicle control device 20 transmits the information relating to the autonomous operation created when the vehicle 12 is to make a left turn to the processing server 18. However, because circumstances exist in which self-driving is difficult, cases in which autonomous operations cannot be created are not limited to these.

In step S49, in the processing server 18 that has received the information relating to the autonomous operation from the vehicle control device 20, the CPU 60A executes decision processing for the remote-control operation information from each remote-control controller 40. In the example given in the present exemplary embodiment, when the vehicle 2 is making a left turn, any one of a remote-control operation performed by operator A, a remote-control operation performed by operator B, or an autonomous operation of the vehicle control device 20 is decided on as the operation relating to the remote-control driving or self-driving of the vehicle 12.

In step S50, the CPU 60A of the processing server 18 transmits a notification announcing that either the remote-control operation or the autonomous operation has been decided on to the vehicle control device 20 of the vehicle 12. Here, if the autonomous operation has been decided on as the one operation in the decision processing, then because the vehicle control device 20 possesses the information relating to the autonomous information, it is not necessary for information relating to the autonomous information to be acquired from the processing server 18. As a consequence, when autonomous processing is decided on in the decision processing, then notification alone is sufficient.

In step S51, in the vehicle control device 20 of the vehicle 12, the CPU 20A executes remote-control driving or self-driving. More specifically, when remote-control operation information is received, the CPU 20A executes remote-control driving based on this remote-control operation information, and when notification is received announcing that an autonomous operation has been decided on, the CPU 20A executes self-driving based on this autonomous operation. If, for example, a remote-control operation performed by operator A is decided on in the decision processing, the CPU 20A executes a left turn based on a remote-control operation performed by operator A.

The processing flow in step S52 and step S54 in FIG. 14 is the same as the processing flow in step S31 and step S33 in FIG. 10.

Summary of the Second Exemplary Embodiment

In the present exemplary embodiment, the following actions and effects are achieved in addition to those obtained from the first exemplary embodiment.

If a vehicle 12 is about to make a left turn at an intersection of a two-way road while traveling along the right side of this road, then it is necessary to consider the presence of a vehicle traveling in the oncoming lane, or a pedestrian crossing at a crosswalk ahead of the left turn, or traffic congestion on the road ahead of the left turn. Moreover, if a vehicle 12 is about to perform an overtaking maneuver which requires an entry into an oncoming traffic lane, then it is necessary to consider whether or not vehicles are present before and behind the vehicle 12, the speed thereof, and road rules pertaining to the current vehicle lane (i.e., whether or not overtaking in that lane is permissible under the road rules). If the vehicle 2 is performing self-driving, and if a large number of elements such as these that need to be considered are present, then in some cases self-driving is difficult to achieve.

In the present exemplary embodiment, in cases in which technological problems such as these occur, then by deciding on the optimum remote-control operation from the remote-control operations of a plurality of operators, it is possible to inhibit a vehicle from making an emergency stop or from repeating a remote-control operation, and it is also possible for a large number of vehicle remote-control driving operations to be performed by a small number of remote-control drivers.

On the other hand, even in cases when self-driving is difficult, there are still cases when the vehicle control device 20 creates vehicle operation information relating to an autonomous operation. In the decision processing of the present exemplary embodiment, it is possible to add these cases to the range of operations that are decided as being capable of autonomous operation, as well as to the plurality of remote-control operations. As a consequence, even if an acquired remote-control operation cannot be described as optimal, the vehicle 12 is still able to travel by means of self-driving.

[Remarks]

In each of the above-described exemplary embodiments, a mode score, which provides a comparison with a standard score, and the individual score of an operator are used as weightings in the decision processing, however, the present disclosure is not limited to this. For example, in addition to the mode score and individual score, it is also possible to use the level of alertness of an operator as calculate in the bioinformation acquisition unit 420 of the remote-control controller device 40 as weightings in the decision processing.

Moreover, in the decision processing of the respective exemplary embodiments, an operation is decided on based on a determination value which is obtained as the sum of the mode score and the individual score, however, the present disclosure is not limited to this, and it is also possible to decide on an operation using a function containing a predetermined coefficient, or using tables or the like.

In each of the above-described exemplary embodiments, the decision processing is executed in the processing server 18, however, the present disclosure is not limited to this and it is also possible to execute the decision processing in the vehicle control device 20 of the vehicles 12. In this case, in the vehicle control device 20, the CPU 20A acquires the remote-control operation information from each remote-control controller device 40 and also executes the decision processing. The CPU 20A then executes the remote-control operation based on the one remote-control operation that is decided on.

In each of the above-described exemplary embodiments, examples are given in which the remote-control drivers are operators who issue commands relating to the travel course and speed and the like of a vehicle 12 as their remote-control operations, however, the present disclosure is not limited to this, and it is also possible for remote drivers who steer the vehicle as their remote-control operation to be included among the remote-control drivers.

Note also that, in the above-described exemplary embodiments, it is also possible for the various processing executed by the CPU 20A after reading software (i.e., a program), and the various processing executed by the CPU 40A after reading software (i.e., a program), and the various processing executed by the CPU 60A after reading software (i.e., a program) to instead be executed by other types of processor than a CPU. Examples of other types of processor include PLD (Programmable Logic Devices) whose circuit structure can be altered after manufacturing such as an FPGA (Field-Programmable Gate Array), and dedicated electrical circuits and the like which are processors having a circuit structure that is designed specifically in order to execute a particular processing such as ASIC (Application Specific Integrated Circuits). In addition, the respective processing may be executed by just one type from among these various types of processor, or by a combination of two or more processors that are either the same type or are mutually different types (for example by a plurality of FPGA or by a combination of a CPU and an FPGA). Furthermore, the hardware structure of these different types of processor are, more specifically, electrical circuits obtained by combining circuit elements such as semiconductor elements and the like.

Moreover, in the each of the above-described exemplary embodiments, a mode is described in which a program is stored in advance (i.e., is installed on a non-transitory recording medium capable of being read by a computer. For example, the execution programs in the vehicle control unit 20 of the vehicle 12 are stored in advance in the ROM 20B. Moreover, the processing programs in the remote-control controller devices 40 of the remote-control operating devices 16 are stored in advance in the ROM 40B. Furthermore, in the example given above, the information processing program 650 in the processing server 18 is stored in advance in the storage 60D. However, the present disclosure is not limited to this, and it is also possible for each program to be provided by being recorded on a non-transitory recording medium such as a CD-ROM (Compact Disc Read Only Memory), a DVD-ROM (Digital Versatile Disc Read Only Memory), and USB (Universal Serial Bus) memory. Moreover, each program may also be provided by being able to be downloaded from an external device via a network.

The processing flows described in the forgoing exemplary embodiments are also merely examples thereof, and insofar as this does not cause a departure from the spirit or scope of the present invention, steps that are not required may be deleted, or new steps added, or the sequence of the steps may be altered.

Exemplary embodiments of the present disclosure have been described above, however, the present disclosure is not limited to these. Various modifications and the like may be made to the present disclosure insofar as they do not depart from the spirit or scope of the present disclosure.

What is claimed is:

1. An operation selection device comprising a memory and a processor, wherein
   the processor is configured to:
   perform communication between a self-driving device that is provided at a vehicle which performs self-driving, and a plurality of operating devices that enable the vehicle to be driven remotely via a remote-control operation performed by a remote-control driver, and that are individually provided for each of a plurality of remote-control drivers;
   acquire information relating to remote-control operations performed by each remote-control driver using each of the plurality of operating devices for an event receiving the remote-control operation in the vehicle currently being driven remotely;
   acquire, from the self-driving device, information relating to an autonomous operation that is required to perform the self-driving and that was created for the event;
   determine whether the self-driving that is necessary to perform the autonomous operation would be difficult;
   in a case that the self-driving is determined not to be difficult, cause the self-driving device to perform driving of the vehicle; and
   in a case that the self-driving is determined to be difficult:
   allocate a score, to each remote-control driver that could perform one of the plurality of remote-control operations instead of the autonomous operation;
   decide, using a predetermined weighting, whether to choose the one of the plurality of remote-control operations or instead to proceed with the autonomous operation;
   select one device among the plurality of operating devices or the self-driving device based upon the deciding; and
   cause the selected device to perform driving of the vehicle by communicating with the selected device.

2. The operation selection device according to claim 1, wherein the processor is configured to alter the weighting in accordance with the score belonging to the remote-control driver and a mode of the remote-control operation.

3. The operation selection device according to claim 1, wherein the processor is configured so that, when an incorrect operation is contained in the remote-control operations, the processor decides on the one operation after removing the incorrect operation.

4. The operation selection device according to claim 1, wherein the processor is configured to allocate a frequency of remote-control operations to a remote-control driver based upon the score of the remote-control driver, wherein the higher the score of the remote-control driver, the higher the frequency of the remote-control operations allocated to the driver.

5. The operation selection device according to claim 1, wherein the processor is configured to alter the weighting in accordance with an area and time of occurrence of the event.

6. An operation selection method performed by a processor, the method comprising:
  performing communication between a self-driving device that is provided at a vehicle which performs self-driving, and a plurality of operating devices that enable the vehicle to be driven remotely via a remote-control operation performed by a remote-control driver, and that are individually provided for each of a plurality of remote-control drivers;
  acquiring information relating to remote-control operations performed by each remote-control driver using each of the plurality of operating devices for an event receiving the remote-control operation in the vehicle currently being driven remotely;
  acquiring, from the self-driving device, information relating to an autonomous operation that is required to perform the self-driving and that was created for the event;
  determining whether the self-driving that is necessary to perform the autonomous operation would be difficult;
  in a case that the self-driving is determined not to be difficult, cause the self-driving device to perform driving of the vehicle; and
  in a case that the self-driving is determined to be difficult:
    allocating a score, to each remote-control driver that could perform one of the plurality of remote-control operations instead of the autonomous operation;
    deciding, using a predetermined weighting, whether to choose the one of the plurality of remote-control operations or instead to proceed with the autonomous operation;
    selecting one device among the plurality of operating devices or the self-driving device based upon the deciding; and
    causing the selected device to perform driving of the vehicle by communicating with the selected device.

7. The operation selection method according to claim 6, further comprising altering the weighting in accordance with the score belonging to the remote-control driver and a mode of the remote-control operation.

8. The operation selection method according to claim 6, wherein, when an incorrect operation is contained in the remote-control operations, the processor decides on the one operation after removing the incorrect operation.

9. The operation selection method according to claim 6, further comprising allocating a frequency of remote-control operations to a remote-control driver based upon the score of the remote-control driver, wherein the higher the score of the remote-control driver, the higher the frequency of the remote-control operations allocated to the driver.

10. The operation selection method according to claim 6, further comprising altering the weighting in accordance with an area and time of occurrence of the event.

11. A non-transitory storage medium on which is stored a program that is executable by a processor to perform operation selection processing in which:
  communication is performed between a self-driving device that is provided at a vehicle which performs self-driving, and a plurality of operating devices that enable the vehicle to be driven remotely via a remote-control operation performed by a remote-control driver, and that are individually provided for each of a plurality of remote-control drivers;
  information relating to remote-control operations performed by each remote-control driver is acquired using each of the plurality of operating devices for an event receiving the remote-control operation in the vehicle currently being driven remotely;
  information relating to an autonomous operation that is required to perform the self-driving and that was created for the event is acquired from the self-driving device;
  whether the self-driving that is necessary to perform the autonomous operation would be difficult is determined;
  in a case that the self-driving is determined not to be difficult, the self-driving device is caused to perform driving of the vehicle; and
  in a case that the self-driving is determined to be difficult:
    a score is allocated to each remote-control driver that could perform one of the plurality of remote-control operation instead of the autonomous operation;
    whether to choose the one of the plurality of remote-control operations or instead to proceed with the autonomous operation is decided on using a predetermined weighting;
    one device among the plurality of operating devices or the self-driving device is selected based upon the deciding; and
    the selected device is caused to perform driving of the vehicle by communicating with the selected device.

12. The non-transitory storage medium according to claim 11, wherein, in the operation selection processing, the weighting is altered in accordance with the score belonging to the remote-control driver and a mode of the remote-control operation.

13. The non-transitory storage medium according to claim 11, wherein, in the operation selection processing, when an incorrect operation is contained in the remote-control operations, the one operation is decided on after the incorrect operation has been removed.

14. The non-transitory storage medium according to claim 11, wherein, in the operation selection processing, allocating a frequency of remote-control operations to a remote-control driver based upon the score of the remote-control driver, wherein the higher the score of the remote-control driver, the higher the frequency of the remote-control operations allocated to the driver.

15. The non-transitory storage medium according to claim 11, wherein, in the operation selection processing, the weighting is altered in accordance with an area and time of occurrence of the event.

* * * * *